United States Patent
Sorensen et al.

(10) Patent No.: US 10,182,160 B2
(45) Date of Patent: Jan. 15, 2019

(54) SPEAKERPHONE SYSTEM OR SPEAKERPHONE ACCESSORY WITH ON-CABLE MICROPHONE

(71) Applicant: AVNERA CORPORATION, Beaverton, OR (US)

(72) Inventors: Eric Sorensen, Portland, OR (US); Thomas Irrgang, Portland, OR (US); Mike Wurtz, Lake Oswego, OR (US)

(73) Assignee: Avnera Corporation, Beaverton, OR (US)

( * ) Notice: Subject to any disclaimer, the term of this patent is extended or adjusted under 35 U.S.C. 154(b) by 70 days.

(21) Appl. No.: 15/354,909

(22) Filed: Nov. 17, 2016

(65) Prior Publication Data

US 2017/0142262 A1 May 18, 2017

Related U.S. Application Data

(60) Provisional application No. 62/257,120, filed on Nov. 18, 2015.

(51) Int. Cl.
*H04M 9/08* (2006.01)
*H04M 1/60* (2006.01)
(Continued)

(52) U.S. Cl.
CPC ......... *H04M 9/082* (2013.01); *H04M 1/6041* (2013.01); *H04M 1/62* (2013.01); *H04M 1/72527* (2013.01)

(58) Field of Classification Search
CPC ....... H04M 9/082; G01S 7/292; G10L 21/034
USPC ....... 348/14.07; 379/406.06, 406.08, 420.02, 379/420.03, 428.03, 56.3, 388.02, 406.01; 455/90.03, 403, 569.1, 569.2; 342/357.63; 375/285; 381/81
See application file for complete search history.

(56) References Cited

U.S. PATENT DOCUMENTS 4,543,665 A * 9/1985 Sotelo ................... H04M 1/737
379/56.3
4,658,425 A * 4/1987 Julstrom ............... H04M 3/569
379/206.01
(Continued)

OTHER PUBLICATIONS

Polycom, Inc., Polycom® SoundStation2™ Data Sheet, found at www.polycom.com, 2012, 3 pages.
(Continued)

*Primary Examiner* — Gerald Gauthier
(74) *Attorney, Agent, or Firm* — Miller Nash Graham & Dunn LLP

(57) ABSTRACT

A portable speakerphone having a housing, a receiving transducer, an electrical cable, a transmitting transducer, and a processor. The receiving transducer is affixed to the housing and is configured to receive a first electrical signal from a mobile device. The electrical cable is coupled to and extends from the housing. The transmitting transducer is affixed to the electrical cable, remote from the housing. Also, the transmitting transducer is configured to transmit a second electrical signal, and the second electrical signal is based in part on the first electrical signal. The processor is configured to suppress acoustic echo by modifying the second electrical signal. The processor is also configured to output the modified second electrical signal to the mobile device. A related method is also disclosed.

19 Claims, 4 Drawing Sheets

(51) Int. Cl.
*H04M 1/62* (2006.01)
*H04M 1/725* (2006.01)

(56) References Cited

U.S. PATENT DOCUMENTS

| | | | | |
|---|---|---|---|---|
| 5,121,426 A | * | 6/1992 | Baumhauer, Jr. | H04M 1/20 379/388.02 |
| 5,323,458 A | * | 6/1994 | Park | H04M 9/082 379/391 |
| 5,369,701 A | * | 11/1994 | McAteer | H04M 1/62 379/420.02 |
| 5,577,118 A | * | 11/1996 | Sasaki | H04M 1/02 379/428.01 |
| 5,588,041 A | * | 12/1996 | Meyer, Jr. | H04M 1/6075 379/388.01 |
| 6,151,490 A | * | 11/2000 | Schultheiss | H04M 1/725 348/E5.103 |
| 6,768,914 B1 | * | 7/2004 | Garey | H04M 1/6033 455/569.1 |
| 7,151,912 B1 | * | 12/2006 | Morrison | H04M 1/15 455/90.3 |
| 8,290,142 B1 | | 10/2012 | Lambert | |
| 2002/0183101 A1 | * | 12/2002 | Oh | H04M 1/6075 455/569.2 |
| 2003/0002691 A1 | | 1/2003 | Ono et al. | |
| 2003/0104842 A1 | * | 6/2003 | Choi | H04M 1/05 455/569.1 |
| 2004/0180631 A1 | * | 9/2004 | Lim | H04B 1/385 455/90.3 |
| 2005/0231586 A1 | * | 10/2005 | Rodman | H04B 1/40 348/14.07 |
| 2006/0093128 A1 | * | 5/2006 | Oxford | H04M 9/082 379/406.01 |
| 2007/0263845 A1 | * | 11/2007 | Hodges | H04R 1/345 379/388.02 |
| 2008/0108394 A1 | * | 5/2008 | Davis | H04M 1/03 455/569.1 |
| 2015/0180536 A1 | | 6/2015 | Zhang et al. | |
| 2017/0142262 A1 | * | 5/2017 | Sorensen | H04M 1/6041 |

OTHER PUBLICATIONS

International Search Report, PCTUS2016062596, dated Feb. 15, 2017, 6 pages.

* cited by examiner

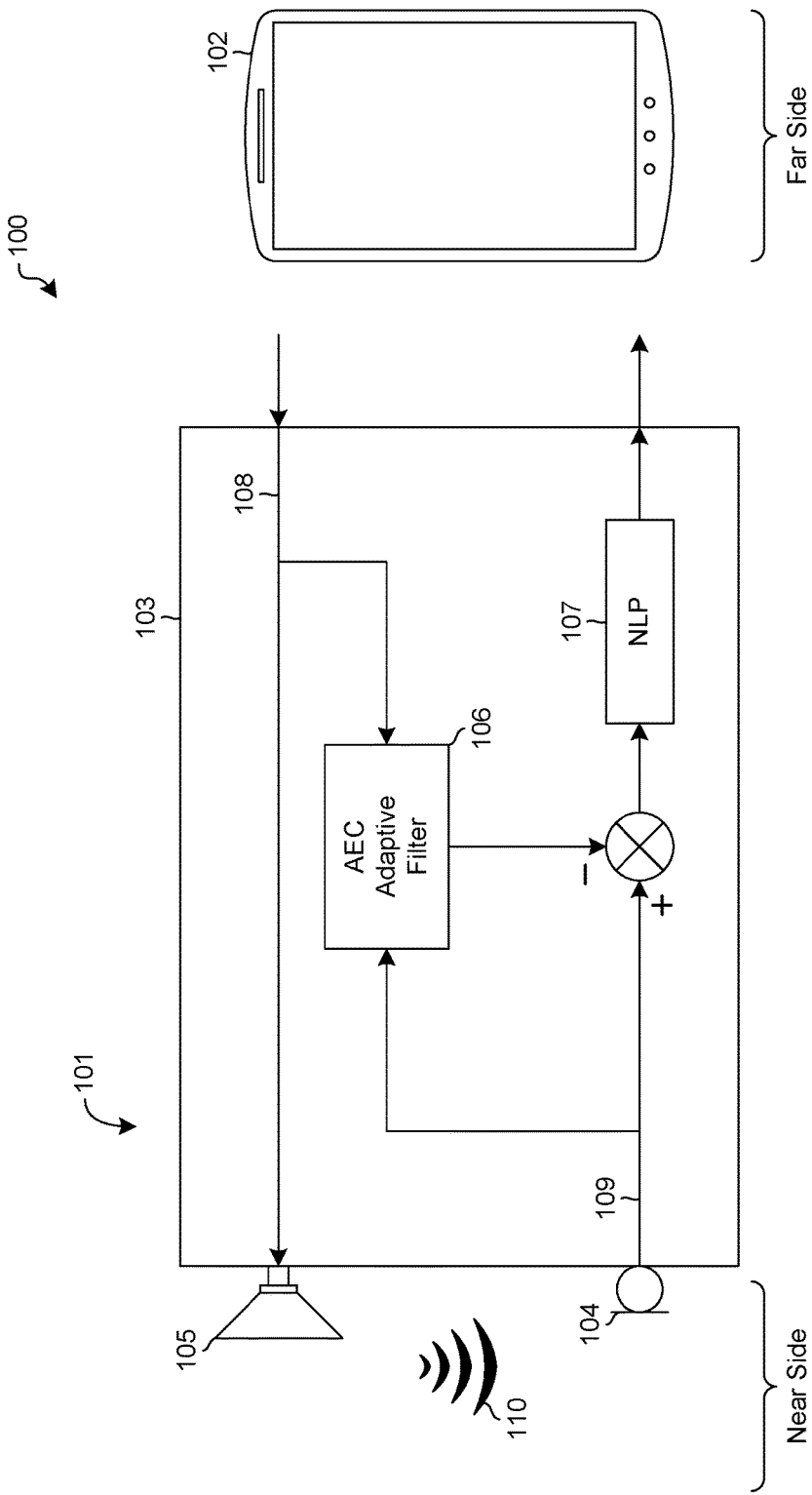
FIG. 1
Conventional

SPEAKERPHONE SYSTEM OR SPEAKERPHONE ACCESSORY WITH ON-CABLE MICROPHONE

CROSS REFERENCE TO RELATED APPLICATION

This patent application claims priority to and the benefit of U.S. Provisional Application No. 62/257,120, filed Nov. 18, 2015, which is incorporated in this patent application by this reference.

FIELD OF THE INVENTION

This disclosure relates to telecommunication, and, more particularly, to a system and methods for reducing echo in a speakerphone call.

BACKGROUND

One purpose of a speakerphone system is to allow a user to conduct a phone call without having to hold a conventional handset. Thus, a speakerphone may allow the user's hands to be free, the user to move freely about the room while participating in the call, and multiple people to participate in the phone call from one location, such as a conference room.

A conventional speakerphone system 100, such as shown in FIG. 1, may include a speakerphone 101 and a far-side phone 102. The speakerphone 101 may include a speakerphone housing 103, having a microphone 104 and a loudspeaker 105 within the speakerphone housing 103 or supported by the speakerphone housing 103. The speakerphone 101 may also include an acoustic echo cancellation (AEC) filter 106 and a non-linear processing (NLP) module 107.

In the context of speakerphone systems, the party speaking and listening through the speakerphone is typically called the near side, while the party calling into the speakerphone is typically called the far side. Hence the far-side party calls in through the far-side phone 102. Additionally, a signal received from the far-side phone 102 propagates through a receive path (Rx-path) and is called an Rx-path signal 108, while the signal received by the microphone 104 propagates through a transmit path (Tx-path) and is called a Tx-path signal 109.

Also, there are two common modes for a conventional speakerphone. In full-duplex mode, the Rx-path and the Tx-path are each fully active, or open, at any given time during the phone call. In half-duplex mode, however, only one of the two paths is open at a time. Thus, for example, if the far-side party is talking, the Rx-path is active and the Tx-path is muted. This helps to avoid echo at the far side. Yet, it also means that the inactive side, which is the side that is not speaking, cannot interrupt the active side, which is the side that is speaking, because the inactive side is muted. Accordingly, the half-duplex mode may lead to an unnatural experience for the parties, making it difficult to hold a conversation.

One fundamental problem of conventional speakerphones is a loudspeaker-to-microphone bypass signal 110 on the near side. This bypass signal 110 is also called the acoustic echo path, and the far-side party may experience the bypass signal 110 as an echo. In other words, the far-side party may hear his or her own voice signal coming back, usually after a short delay.

To overcome this problem, many conventional speakerphones implement an acoustic echo cancellation (AEC) signal-processing algorithm, for example, through the AEC filter 106. In general, the AEC algorithm compares the incoming, receive-path signal 108 with the outgoing, transmit-path signal 109 and then subtracts the incoming signal 108 from the outgoing signal 109. As a result, the processed transmit-path signal contains content from the near side, but not content received from the far side. Accordingly, the acoustic-echo-path signal 110 may be reduced or eliminated.

The NLP module 107 may provide additional suppression of any remaining acoustic echo, particularly of any component of the acoustic echo that is non-linear. This is generally done by destructively removing a portion of the outgoing, transmit-path signal 109, although this may damage the signal.

While AEC algorithms generally work well, one challenge with implementing them is the close proximity of the microphone 104 to the loudspeaker 105 in a conventional speakerphone system 100. That is, as the microphone 104 is positioned closer to the loudspeaker 105, the incoming signal picked up by the microphone 104 becomes louder, or stronger. The desired signal from the party talking at the near side, however, typically originates much farther from the microphone 104 than the loudspeaker 105 is from the microphone 104. Hence, the desired signal presents a significantly quieter, or weaker, signal to the microphone 104 relative to the Rx-path signal 108 rendered by the loudspeaker 105.

The ratio between the desired signal from the party talking at the near side and the acoustic echo path 110 can be quantified as a signal-to-echo ratio. As a conventional rule of thumb, a signal-to-echo ratio of down to about −20 or −25 dB can be managed by a conventional AEC algorithm. This means that the AEC algorithm is effective at canceling the acoustic echo up to about that ratio. For ratios smaller than about −20 or −25 dB, echo cancellation may be much less effective, meaning that the far-side party may perceive an echo, or a partial echo, of that party's own voice because all or some of the acoustic echo may bleed through the AEC filter 106. A high-quality system is one that provides full duplex support and no echo at the far side. At a signal-to-echo ratio of less than about −25 dB, however, that goal generally cannot be achieved.

Additionally, the signal-to-echo ratio can be a significant problem in small speakerphones, where the smaller size means that the loudspeaker 105 must be closer to the microphone 104. Mathematically, halving the distance between the loudspeaker 105 and the microphone 104 results in a 6 dB decrease in the signal-to-echo ratio. For example, if the signal-to-echo ratio is −15 dB at a distance of 30 mm, halving the distance between the loudspeaker 105 and the microphone 104 to 15 mm results in a signal-to-echo ratio of −21 dB. Likewise, doubling the distance between the loudspeaker 105 and the microphone 104 results in a 6 dB increase in the signal-to-echo ratio. Thus, high-quality speakerphone systems tend to be relatively large to provide a favorable distance between the microphone 104 and the loudspeaker 105.

Furthermore, while the main portion of the acoustic echo path signal 110 travels through the air, a portion of the acoustic echo path signal 110 may be conducted structurally, through the coupling between the loudspeaker 105 and the microphone 104. For example, a plastic housing component may rattle at the loudspeaker's frequency, and the rattling may be transmitted through structural conduction to the microphone 104 where it is sensed. Additionally, this structurally conducted sound has a transfer function that is typically non-linear. Conventional speakerphones may address such unwanted structural sound by including suspension mechanisms, such as rubber sleeves or springs, to isolate the mechanical vibration. Those solutions, however, increase the cost and complexity of the speakerphone system. Also, those solutions might not effectively reduce the structural sound at some frequencies.

Embodiments of the invention address these and other issues in the prior art.

SUMMARY OF THE DISCLOSURE

Embodiments of the disclosed subject matter provide a speakerphone with a relatively small form factor but an improved signal-to-echo ratio over existing small speakerphones. Accordingly, embodiments include a loudspeaker in a housing and a microphone that is remote from the housing, on a cable or on a connector at a distal end of the cable. Thus, relative to conventional designs with the microphone and loudspeaker in the same housing, the microphone and the loudspeaker are farther apart and mechanically isolated from each other, both without increasing the form factor of the housing.

Accordingly, at least some embodiments of a portable speakerphone may include a housing, a receiving transducer, an electrical cable, a transmitting transducer, and a processor. The receiving transducer is affixed to the housing and is configured to receive a first electrical signal from a mobile device. The electrical cable is coupled to and extends from the housing. The transmitting transducer is affixed to the electrical cable, remote from the housing. Also, the transmitting transducer is configured to transmit a second electrical signal, and the second electrical signal is based in part on the first electrical signal. The processor is configured to suppress acoustic echo by modifying the second electrical signal. The processor is also configured to output the modified second electrical signal to the mobile device.

In another aspect, in at least some embodiments of the speakerphone, the receiving transducer is a loudspeaker.

In yet another aspect, in at least some embodiments of the speakerphone, the transmitting transducer is a microphone.

In still another aspect, in at least some embodiments of the speakerphone, the electrical cable has a connector at a distal end of the electrical cable, opposite a proximal end of the electrical cable coupled to the housing, and the transmitting transducer is a microphone located along the electrical cable, between the proximal end of the electrical cable and the connector. In other embodiments, the transmitting transducer is a microphone affixed to the connector or substantially enclosed within the connector.

In another aspect, at least some embodiments of a method of calibrating a distance between a loudspeaker and a microphone in a speakerphone may include receiving, at a loudspeaker affixed to a housing, a receive-path signal from a far-side device; transmitting, by a microphone remote from the housing and affixed to a distal end of an electrical cable that is coupled to and extends from the housing at a proximal end of the electrical cable, a transmit-path signal, the transmit-path signal being based in part on the receive-path signal; determining, by a processor, a signal-to-echo ratio of the second electrical signal; increasing a length of the electrical cable until the determined signal-to-echo ratio is greater than a minimum desired ratio, the minimum desired ratio being about −25 dB; modifying, by the processor, the transmit-path signal; and outputting the modified transmit-path signal to the far-side device.

BRIEF DESCRIPTION OF THE DRAWINGS

FIG. 1 is a functional block diagram showing signal paths in a conventional speakerphone system.

DETAILED DESCRIPTION

As described herein, embodiments of the invention are directed to an apparatus providing a speakerphone with a relatively small form factor but an improved signal-to-echo ratio over existing small speakerphones. Accordingly, embodiments of the invention include a loudspeaker in a housing and a microphone that is remote from the housing, on a cable or on a connector at a distal end of the cable. In this way, the microphone and the loudspeaker may be separated at a distance without increasing the form factor of the housing. Also, in a mechanical sense, the microphone and the loudspeaker are substantially isolated from each other because the microphone is remote from the housing. This helps to reduce or eliminate the structural transmission of sound waves, without the need for additional structures, such as suspension mechanisms, to isolate the mechanical vibration from the sound waves.

As used in this disclosure, a "small form factor" with respect to a speakerphone housing means that, if a microphone and a loudspeaker were both integrated in the housing, the distance between the microphone and the loudspeaker would be less than about 100 mm (about 4 inches). To put it another way, the housing and the electrical cable may be configured to separate the microphone and the loudspeaker by more than about four inches, with the microphone being outside of the housing. Thus, for example, if the housing is essentially box-shaped, such as the loudspeaker housing 203 of FIG. 2, then "small form factor" means that the length, the width, and the height of the housing each do not exceed about four inches. To generalize this further, including for housings that are not box-shaped, "small form factor" means that the distance between the microphone and the loudspeaker is greater than maximum external dimension of the housing. Accordingly, the microphone is farther away from the loudspeaker than it would be if the microphone were within the speakerphone housing, and the microphone is structurally isolated from the housing, and likewise the loudspeaker, by the cable. The distances are measured with the cable fully extended away from the speakerphone housing.

Figure 2:
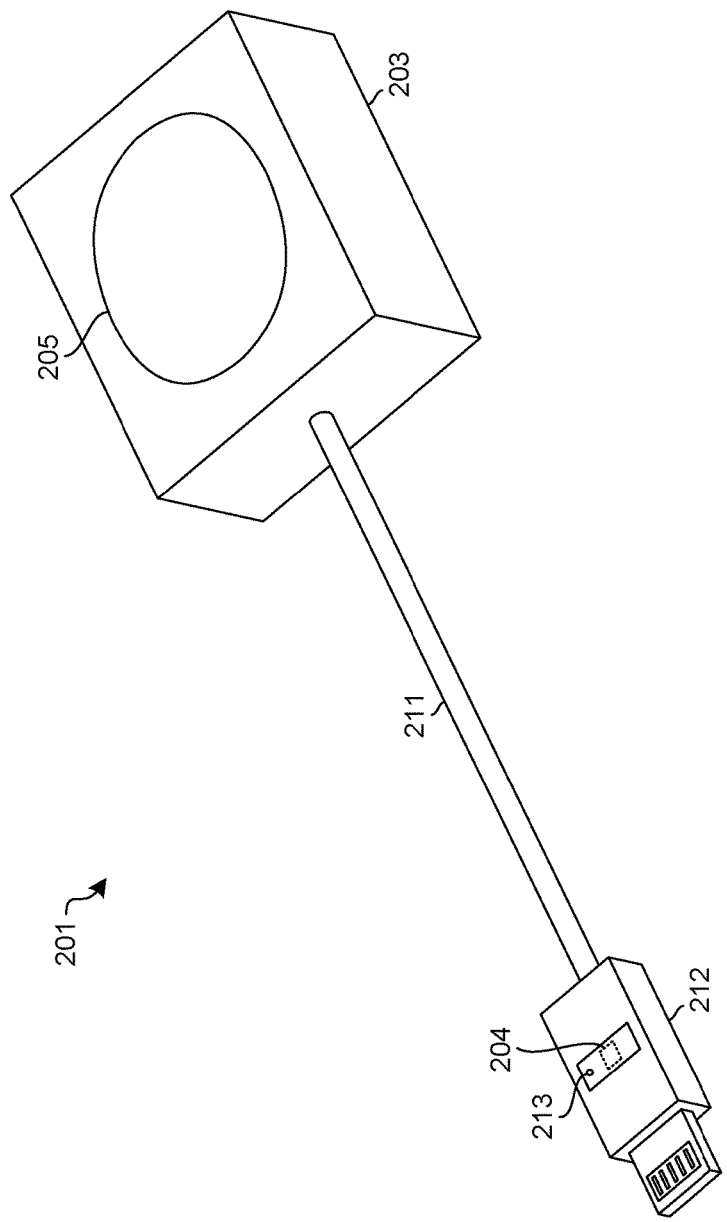
FIG. 2 is a front, perspective view of a speakerphone with an on-cable microphone, according to embodiments of the invention.

FIG. 2 is a front, perspective view showing material portions of a speakerphone 201 with an on-cable microphone according to embodiments of the invention. As illustrated in FIG. 2, a speakerphone 201 with an on-cable microphone may include a loudspeaker housing 203, a cable 211, a connector 212, a receiving transducer 205, and a transmitting transducer 204.

The receiving transducer 205 is configured to receive an electrical signal. For example, the receiving transducer 205 may be a loudspeaker that is configured to receive and render an audio signal.

The transmitting transducer 204 is configured to transmit an electrical signal. For example, the transmitting transducer 204 may be a microphone, and the transmitting transducer 204 may be configured to transmit a microphone signal. The transmitting transducer 204 may include, as examples, an electret condenser microphone (ECM), a microelectromechanical system (MEMS) microphone, or a dynamic microphone capsule. As another example, the transmitting transducer 204 may be an accelerometer, such as an accelerometer to detect sound vibrations. Other types of transmitting transducers may also be used.

The connector 212 may be any connector configured to connect to an electronic device, such as a mobile device. As examples, the mobile device may be a cellular telephone, a smartphone, or a tablet computer. The connector 212 may be, for example, a universal serial bus (USB) connector. In embodiments, such as shown in FIG. 2, the transmitting transducer 204 may be integrated into the connector 212 by being substantially enclosed within the connector 212. In such embodiments, the connector 212 may include an aperture 213 to permit sound waves, for example, to be sensed by the transmitting transducer 204. Alternatively, the transmitting transducer 204 may be attached, or affixed, to the connector 212. When the connector 212 is connected to the electronic device, the speakerphone 201 may signal the electronic device to deactivate the electronic device's microphone or loudspeaker or both.

The loudspeaker housing 203 may substantially enclose or otherwise support the receiving transducer 205. The loudspeaker housing 203 may have one or more substantially flat outer surfaces configured to rest on a horizontal support surface, such as a desk or table. The loudspeaker housing 203 may be made from plastic, metal, or another rigid or semi-rigid material.

The cable 211 extends from the loudspeaker housing 203 and physically connects the connector 212 to the loudspeaker housing 203. The cable 211 may be any cable, such as a flexible, electrical cable, configured to carry an electrical signal between the connector 212 and the loudspeaker housing 203. In some embodiments, the transmitting transducer 204 may be located along the cable 211 rather than at the connector 212. In such embodiments, the transmitting transducer 204 may be substantially enclosed within a transducer housing. The transducer housing may be configured to protect the transmitting transducer 204, and it may be configured to channel a signal, such as a sound wave, to the transmitting transducer 204. The cable 211 may be permanently attached to the loudspeaker housing 203, or the cable 211 may be detachably connected to the loudspeaker housing 203, such as with a second electrical connector.

The cable 211 may be of any suitable length, although the cable 211 preferably has a length between about 3 inches (about 80 mm) and about 3 feet (about 0.9 m). More preferably, the cable 211 has a length between about 5 inches (about 130 mm) and about 2 feet (about 0.6 m). In this context, a "suitable length" is a length that results in there being a distance between the receiving transducer 205 and the transmitting transducer 204 such that the signal-to-echo ratio is no less than about −25 dB (decibels) or, more preferably, no less than about −20 dB.

In some embodiments, there may be more than one transmitting transducer 204. For example, one or more transmitting transducers 204 may be located at the connector 212, and one or more transmitting transducers 204 may be located on the cable 211, or both, to form an array of transmitting transducers 204. The array of transmitting transducers 204 may form, for example, a beamforming array. As another example, in embodiments where the transmitting transducer 204 is a microphone, the array of microphones may be configured as a directional microphone.

Figure 3:
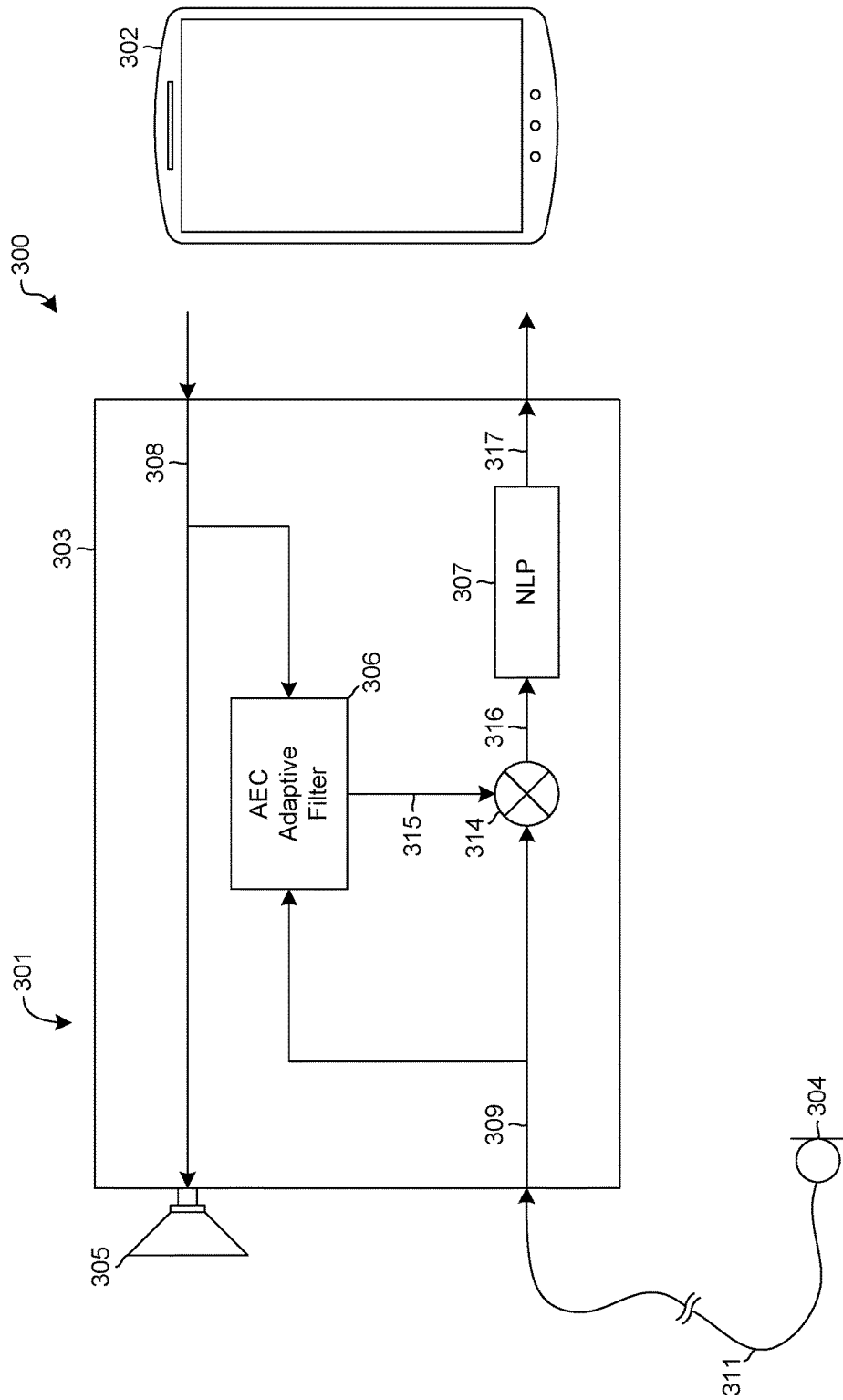
FIG. 3 is a functional block diagram showing signal paths in a system incorporating a speakerphone with an on-cable microphone, according to embodiments of the invention.

FIG. 3 is a functional block diagram showing material portions of signal paths in a system 300 incorporating a speakerphone with an on-cable microphone. As illustrated in FIG. 3, a system 300 incorporating a speakerphone with an on-cable microphone may include a speakerphone 301 and the ability to connect to a far-side device 302. The speakerphone 301 may include a transmitting transducer 304, a receiving transducer 305, an acoustic echo cancellation (AEC) processor 306, a non-linear processing (NLP) module 307, and a mixer 314. The speakerphone 301 may also include other signal processing configured to enhance signal quality.

In operation, a call is initiated by either the far-side device 302 or the speakerphone 301. When a call is active, the transmitting transducer 304 transmits a transmit-path signal 309 that is received by the AEC processor 306 and the mixer 314. Also, the receiving transducer 305 and the AEC processor 306 receive a receive-path signal 308 from the far-side device 302. The AEC processor 306 outputs an AEC signal 315 to the mixer 314, and the mixer 314 combines the AEC signal 315 and the transmit-path signal 309 to output a reduced echo-path signal 316 to the NLP module 307. The NLP module 307 receives the reduced echo-path signal 316 and outputs a processed signal 317 that is transmitted to the far-side device 302.

The transmitting transducer 304 and the receiving transducer 305 may be generally as described above for FIG. 2. Thus, the transmitting transducer 304 may be a microphone, and the receiving transducer 305 may be a loudspeaker. The transmitting transducer 304 is separated from the receiving transducer 305 by a cable 311 to structurally isolate the transmitting transducer 304 from the receiving transducer 305 and to cause the transmitting transducer 304 and the receiving transducer 305 to be separated at a distance. As discussed above, because of this distance, the signal-to-echo ratio improves over what the ratio would be at a closer distance. Since the cable 311 may have a variety of suitable lengths, such as those described above for the cable 211, the cable 311 is shown in FIG. 3 with break lines.

The AEC processor 306 and the NLP module 307 operate generally as discussed above for FIG. 1, and the AEC processor 306 may include an AEC filter or an AEC adaptive filter. That is, the AEC processor 306 may include a signal-processing algorithm that compares the incoming, receive-path signal 308 with the outgoing, transmit-path signal 309 and then subtracts the incoming signal from the outgoing signal. The subtracting of the receive-path signal 308 from the transmit-path signal 309 may be in combination with the mixer 314.

The telephone functionality for the near side may be integrated into the speakerphone 301, or the telephone functionality may be provided by an external device, such as a traditional, wired telephone; a cellular telephone; or a Voice over Internet Protocol (VoIP) telephone or device, including a computer or mobile device operating over the Internet, for example. If the telephone functionality is provided by an external device, the external device may mediate between the speakerphone 301 and the far-side device 302. An example of this is shown in FIG. 4.

Returning to FIG. 3, the far-side device 302 may be a communication device, such as a traditional, wired telephone; a cellular telephone; or a Voice over Internet Protocol (VoIP) telephone or device, including a computer or mobile device operating over the Internet, for example.

One or more of the AEC processor 306, the NLP module 307, and the mixer 314 may be located in a loudspeaker housing 303, such as the loudspeaker housing 203 of FIG. 2. Alternatively, one or more of those components may be located in a connector, such as the connector 212 of FIG. 2.

Figure 4:
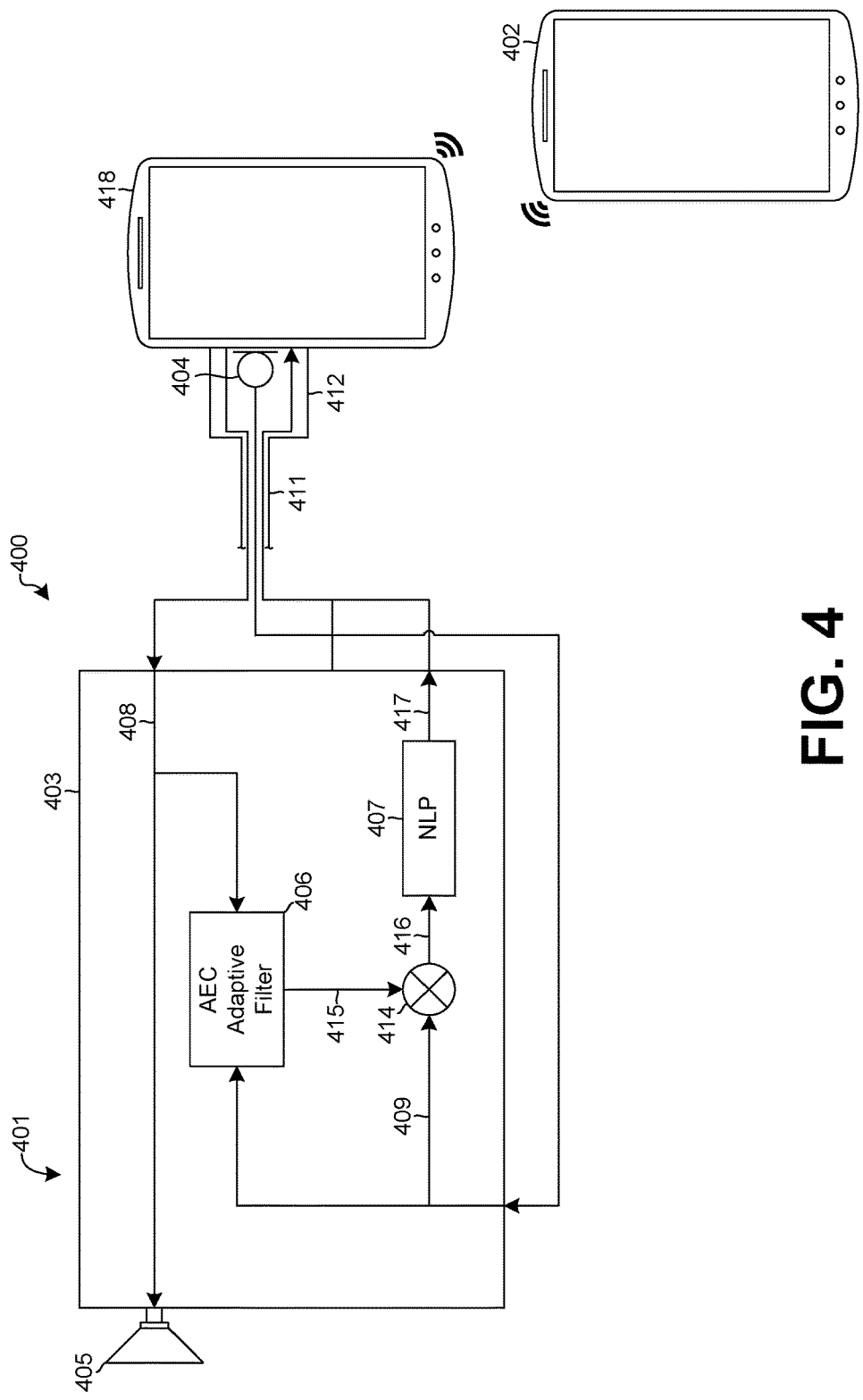
FIG. 4 is a functional block diagram showing signal paths in a system incorporating a speakerphone with an on-cable microphone, according to embodiments of the invention.

FIG. 4 is a functional block diagram showing material portions of signal paths in a system 400 incorporating a speakerphone with an on-cable microphone. As illustrated in FIG. 4, a system 400 incorporating a speakerphone with an on-cable microphone may include a speakerphone accessory 401, a near-side device 418, and the ability to connect to a far-side device 402. The ability to connect to a far-side device 402 may be wireless, as illustrated in FIG. 4, or the ability to connect may be wired or a combination of wired and wireless connections. The speakerphone accessory 401 may be the speakerphone 201 of FIG. 2. In the system 400 of FIG. 4, though, the term "accessory" is used because the speakerphone accessory 401 connects to the near-side device 418, which may provide the telephone functionality for the near side.

Thus, the speakerphone accessory 401 may include a transmitting transducer 404, a receiving transducer 405, an acoustic echo cancellation (AEC) processor 406, a non-linear processing (NLP) module 407, and a mixer 414. The speakerphone accessory 401 may also include other signal processing configured to enhance signal quality.

The near-side device 418 may be a communication device, such as a traditional, wired telephone; a cellular telephone; or a Voice over Internet Protocol (VoIP) telephone or device, including a computer or mobile device operating over the Internet, for example.

In operation, a call is initiated by either the far-side device 402 or the near-side device 418. When a call is active, the transmitting transducer 404 transmits a transmit-path signal 409 that is received by the AEC processor 406 and the mixer 414. Also, the receiving transducer 405 and the AEC processor 406 receive a receive-path signal 408 from the far-side device 402, through near-side device 418. The AEC processor 406 outputs an AEC signal 415 to the mixer 414, and the mixer 414 combines the AEC signal 415 and the transmit-path signal 409 to output a reduced echo-path signal 416 to the NLP module 407. The NLP module 407 receives the reduced echo-path signal 416 and outputs a processed signal 417 that is transmitted to the far-side device 402.

The transmitting transducer 404 and the receiving transducer 405 may be generally as described above for FIG. 2. Thus, the transmitting transducer 404 may be a microphone, and the receiving transducer 405 may be a loudspeaker. The transmitting transducer 404 may be integrated into a connector 412, such as shown diagrammatically in FIG. 4, or the transmitting transducer 404 may be located along a cable 411. A representative segment of the cable 411 is shown diagrammatically in FIG. 4. The transmitting transducer 404 is separated from the receiving transducer 405 by the cable 411 to structurally isolate the transmitting transducer 404 from the receiving transducer 405 and to cause the transmitting transducer 404 and the receiving transducer 405 to be separated at a distance. As discussed above, because of this distance, the signal-to-echo ratio improves over what the ratio would be at a closer distance. The cable 411 may have a variety of suitable lengths, such as those described above for the cable 211.

The AEC processor 406 and the NLP module 407 operate generally as discussed above for FIG. 1, and the AEC processor 406 may include an AEC filter or an AEC adaptive filter. That is, the AEC processor 406 may include a signal-processing algorithm that compares the incoming, receive-path signal 408 with the outgoing, transmit-path signal 409 and then subtracts the incoming signal from the outgoing signal. The subtracting of the receive-path signal 408 from the transmit-path signal 409 may be in combination with the mixer 414.

Thus, embodiments of the invention may be implemented as an accessory to an existing speakerphone system in a near-side device 418, such as a speakerphone system built in to a mobile device. When connected to the near-side device 418, the speakerphone accessory 401 may supplement or replace the existing system. Also, when connected to the near-side device 418, the speakerphone accessory 401 may signal the near-side device 418 to deactivate the microphone or loudspeaker or both of the near-side device 418.

Accordingly, embodiments of the invention provide a speakerphone with a relatively small form factor but an improved signal-to-echo ratio over conventional small speakerphones by, for example, locating the transmitting transducer remotely from the speakerphone housing containing the receiving transducer. Thus, the transmitting transducer may be located on a connector or a connector cable extending from the housing. In this way, the microphone and the loudspeaker may be separated at a distance without increasing the form factor of the housing. This separation also helps to reduce or eliminate the structural transmission of sound waves that may propagate through the housing. Accordingly, embodiments of the invention may improve the performance of a conventional AEC filter and a conventional NLP module used within the disclosed system.

The previously described versions of the disclosed subject matter have many advantages that were either described or would be apparent to a person of ordinary skill. Even so, all of these advantages or features are not required in all versions of the disclosed apparatus, systems, or methods.

Additionally, this written description makes reference to particular features. It is to be understood that the disclosure in this specification includes all possible combinations of those particular features. For example, where a particular feature is disclosed in the context of a particular aspect or embodiment, that feature can also be used, to the extent possible, in the context of other aspects and embodiments.

Although specific embodiments of the invention have been illustrated and described for purposes of illustration, it will be understood that various modifications may be made without departing from the spirit and scope of the invention.

The invention claimed is:

1. A portable speakerphone comprising:
   a housing;
   a receiving transducer affixed to the housing and configured to receive a first electrical signal from a mobile device;
   an electrical cable coupled to and extending from the housing;
   a transmitting transducer affixed to the electrical cable, remote from the housing, and configured to transmit a second electrical signal, the second electrical signal being based in part on the first electrical signal and an analog voice signal; and
   a processor configured to suppress acoustic echo in the second electrical signal by modifying the second electrical signal, and the processor further configured to output the modified second electrical signal to the mobile device,
   in which the electrical cable has a connector at a distal end of the electrical cable, opposite a proximal end of the electrical cable coupled to the housing.

2. The speakerphone of claim 1, in which the receiving transducer is a loudspeaker, and in which the transmitting transducer is a microphone.

3. The speakerphone of claim 1, in which the electrical cable is detachably attached to the housing.

4. The speakerphone of claim 1, in which the transmitting transducer is a microphone located along the electrical cable, between the proximal end of the electrical cable and the connector.

5. The speakerphone of claim 1, in which the transmitting transducer is a microphone affixed to the connector.

6. The speakerphone of claim 1, in which the transmitting transducer is a microphone substantially enclosed within the connector.

7. The speakerphone of claim 6, in which the connector has a sound aperture configured to permit sound waves to be sensed by the microphone.

8. The speakerphone of claim 1, in which the connector is a universal serial bus (USB) connector.

9. The speakerphone of claim 1, in which, when the speakerphone is connected to another electronic device via the connector, the speakerphone is configured to transmit a signal to the other electronic device to deactivate other electronic device's microphone or loudspeaker or both.

10. The speakerphone of claim 1, in which the housing and the electrical cable are configured to separate the transmitting transducer and the receiving transducer by more than about four inches.

11. The speakerphone of claim 1, in which the housing has a length, a width, and a height, and in which none of the length, the width, nor the height exceeds about four inches.

12. The speakerphone of claim 1, in which the housing and the electrical cable are configured to separate the transmitting transducer and the receiving transducer at a distance, measured along the electrical cable, that is greater than a maximum external dimension of the housing.

13. The speakerphone of claim 1, in which the housing has a substantially flat outer surface configured to rest on a horizontal support surface.

14. The speakerphone of claim 1, in which the receiving transducer is a loudspeaker, in which the transmitting transducer is a microphone, and in which the processor is further configured to receive the first electrical signal and the second electrical signal and to modify the received second electrical signal by subtracting the received first electrical signal from the received second electrical signal.

15. The speakerphone of claim 14, in which the processor includes an acoustic echo cancelation (AEC) processor configured to receive the first electrical signal and the second electrical signal, a mixer to combine an output of the AEC processor with the second electrical signal, and a non-linear processing (NLP) module configured to further suppress acoustic echo by non-linear processing of an output of the mixer.

16. A method of calibrating a distance between a loudspeaker and a microphone in a speakerphone, the method comprising:
receiving, at a loudspeaker affixed to a housing, a receive-path signal from a far-side device;
transmitting, by a microphone remote from the housing and affixed to a distal end of an electrical cable that is coupled to and extends from the housing at a proximal end of the electrical cable, a transmit-path signal, the transmit-path signal being based in part on the receive-path signal;
determining, by a processor, a signal-to-echo ratio of the second electrical signal;
increasing a length of the electrical cable until the determined signal-to-echo ratio is greater than a minimum desired ratio, the minimum desired ratio being about −25 dB;
modifying, by the processor, the transmit-path signal; and
outputting the modified transmit-path signal to the far-side device.

17. The method of claim 16, in which the minimum desired ratio is about −20 dB.

18. The method of claim 16, in which modifying, by the processor, the transmit-path signal includes subtracting the receive-path signal from the transmit-path signal.

19. A portable speakerphone comprising:
a housing having a substantially flat outer surface configured to rest on a horizontal support surface;
a loudspeaker affixed to the housing and configured to receive a first electrical signal from a mobile device;
an electrical cable coupled to and extending from the housing, the electrical cable having a connector at a distal terminus of the electrical cable, opposite a proximal terminus of the electrical cable coupled to the housing;
a microphone affixed to the connector of the electrical cable, remote from the housing, and configured to transmit a second electrical signal, the second electrical signal being based in part on the first electrical signal and an analog voice signal; and
a processor configured to suppress acoustic echo in the second electrical signal by modifying the second electrical signal, and the processor further configured to output the modified second electrical signal to the mobile device,
in which the housing and the electrical cable are configured to separate the microphone and the loudspeaker at a distance, measured along the electrical cable, that is greater than a maximum external dimension of the housing.

* * * * *